US008484035B2

(12) United States Patent
Pentland

(10) Patent No.: US 8,484,035 B2
(45) Date of Patent: Jul. 9, 2013

(54) MODIFICATION OF VOICE WAVEFORMS TO CHANGE SOCIAL SIGNALING

(75) Inventor: Alex Paul Pentland, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1407 days.

(21) Appl. No.: 11/899,460

(22) Filed: Sep. 6, 2007

(65) Prior Publication Data

US 2008/0044048 A1 Feb. 21, 2008

(51) Int. Cl.

| | |
|---|---|
| ***G10L 21/00*** | (2006.01) |
| ***G10L 19/00*** | (2006.01) |
| ***G10L 15/14*** | (2006.01) |
| ***G10L 13/00*** | (2006.01) |
| ***G10L 13/08*** | (2006.01) |
| ***G10L 15/26*** | (2006.01) |
| ***G10L 17/06*** | (2006.01) |

(52) U.S. Cl.

USPC ........ 704/278; 704/256; 704/256.1; 704/258; 704/260; 704/270; 704/270.1; 704/275; 704/500; 704/235; 704/246; 704/247; 704/248

(58) Field of Classification Search

USPC ................... 704/256, 256.1, 260, 270, 270.1, 704/275, 278, 258, 500, 235, 246, 247, 248; 379/265.06, 265.07

See application file for complete search history.

(56) References Cited

U.S. PATENT DOCUMENTS

| | | | | |
|---|---|---|---|---|
| 5,860,064 | A * | 1/1999 | Henton | 704/260 |
| 7,360,151 | B1 * | 4/2008 | Froloff | 715/255 |
| 2003/0050783 | A1 * | 3/2003 | Yoshizawa | 704/270.1 |
| 2004/0088161 | A1 * | 5/2004 | Corrigan et al. | 704/211 |
| 2005/0238161 | A1 * | 10/2005 | Yacoub et al. | 379/265.06 |
| 2005/0250552 | A1 * | 11/2005 | Eagle et al. | 455/567 |
| 2006/0271371 | A1 * | 11/2006 | Tsuboi | 704/277 |
| 2007/0011073 | A1 * | 1/2007 | Gardner et al. | 705/35 |
| 2008/0040199 | A1 * | 2/2008 | Pinhanez | 705/10 |

FOREIGN PATENT DOCUMENTS

WO WO 2005/027091 * 3/2005

OTHER PUBLICATIONS

Pentland, A.; , "Socially aware, computation and communication," IEEE Computer Society , vol. 38, No. 3, pp. 33-40, IEEE, Mar. 2005.*

A. Pentland, "Social Dynamics: Signals and Behavior," Proc. Int'l Conf. Developmental Learning, IEEE Press, 2004.*

* cited by examiner

*Primary Examiner* — Edgar Guerra-Erazo
(74) *Attorney, Agent, or Firm* — Stephen R. Otis

(57) ABSTRACT

A method of altering a social signaling characteristic of a speech signal. A statistically large number of speech samples created by different speakers in different tones of voice are evaluated to determine one or more relationships that exist between a selected social signaling characteristic and one or more measurable parameters of the speech samples. An input audio voice signal is then processed in accordance with these relationships to modify one or more of controllable parameters of input audio voice signal to produce a modified output audio voice signal in which said selected social signaling characteristic is modified. In a specific illustrative embodiment, a two-level hidden Markov model is used to identify voiced and unvoiced speech segments and selected controllable characteristics of these speech segments are modified to alter the desired social signaling characteristic.

20 Claims, 4 Drawing Sheets

MODIFICATION OF VOICE WAVEFORMS TO CHANGE SOCIAL SIGNALING

FIELD OF THE INVENTION

This invention relates to voice communication systems and more particularly to systems for altering speech signals to modify the “social signals” that indicate the speaker’s attitude or state of mind when speaking.

BACKGROUND OF THE INVENTION

People can make good estimates of other peoples’ attitude towards a particular social interaction. In Malcolm Gladwell’s popular book, Blink. *The power of thinking without thinking*, Little Brown (2005), at page 23, he describes the surprising power of “thin-slicing,” defined as “the ability of our unconscious to find patterns in situations and people based on very narrow ‘slices’ of experience.” Gladwell’s observations reflect decades of research in social psychology, and the term “thin slice” comes from a frequently cited study by Nalani Ambady and Robert Rosenthal, *Slices of Expressive Behaviour as Predictors of Interpersonal Consequences: A Meta Analysis*, PhD Thesis Harvard University (1992).

This work has shown that observers can accurately classify participants’ attitude towards the social interaction that they are involved in (e.g., their interest, attraction, attentiveness, friendliness, determination, submissiveness, etc) from non-linguistic voice features using observations as short as six seconds! The accuracy of such ‘thin slice’ classifications are typically around 70%. One important mechanism that allows people to judge attitudes toward the social interaction is “tone of voice.” Indeed, perception of these non-linguistic social signals is often as important as linguistic or affective content in predicting behavioral outcomes as described by Ambrady and Rosenthal (cited above), and by Nass, C. and Brave, S., in *Voice Activated: How People Are Wired for Speech and How Computers Will Speak with Us*, MIT Press (2004). As used herein, the terms “social signals” and “social signaling,” refers to the non-linguistic “tone of voice” characteristics of a human speech message that indicate the speaker’s attitude or state of mind.

SUMMARY OF THE INVENTION

The preferred embodiment of the present invention modifies human voice waveforms to change the perceived ‘social signaling’ of the speaker, e.g., to make the speaker seem more or less interested, attracted, attentive, friendly, determined, submissive, or other similar property of a verbal social interaction. The preferred embodiment automatically modifies a human voice signal to display more or less of the ‘tone of voice’ features that indicate the speaker’s attitude towards the social interaction in which the speaker is engaged.

There are many instances in day-to-day life where the vocal ‘social signals’ that indicate a speaker’s attitude can have significant impact. The success of product marketing, negotiation, persuasive conversation, and many other interactions rely on the speaker presenting the correct attitude toward the interaction. To improve a speaker’s performance, the preferred embodiment modifies the speaker’s ‘social signals’ so that they are perceived as having a ‘better’ or ‘more productive’ attitude.

In its preferred form, the invention employs a method for altering a selected social signaling characteristic of a speech signal. A statistically large number of speech samples created by different speakers in different tones of voice are evaluated to determine one or more relationships that exist between a selected social signaling characteristic and one or more measurable parameters of the speech samples. An input audio voice signal is then processed in accordance with the relationship(s) to modify one or more of controllable parameters of the input audio voice signal to produce a modified output audio voice in which the selected social signaling characteristic is altered to achieve a desired effect. A variety of social signaling characteristics may be controlled using the invention, including the signal’s tone of voice indicating the speaker’s interest, attraction, attentiveness, friendliness, submissiveness, and/or persuasiveness. The controllable parameters that may be varied to modify a desired social signaling characteristic include the voice signal’s activity level, speaking rate, engagement, emphasis, pause length entropy, and mirroring.

In the preferred embodiment of the invention, parameters of voiced segments (vowel sounds), including the voiced segment pitch, formants, volume and duration, may be modified to control a social signaling characteristics. Parameters of unvoiced segments including spectral envelope, entropy, volume and duration may also be modified to control social signaling characteristics.

The invention may be used to modify a speech signal to alter one or more of its social signaling characteristics. The audio input signal is analyzed identify segments which represent specific spoken utterances, and a signal processor modifies one or more attributes of at least selected ones of these spoken segments to form an audio output signal having altered social signaling. One such social signaling characteristics is persuasiveness which may be controlled by varying the duration of the voiced spoken segments, and by regulating the volume of the spoken segments in varying amounts.

The invention can automatically modify one or more social signaling characteristics of an audio input signal to produce a modified audio output signal by using a digital signal analyzer to determine the boundaries between speech segments and non-speech segments of said audio input signal, to modify one or more controllable parameters of the speech segments to produce modified speech segments having one or more modified social signaling characteristics, and output means for combining the modified speech segments the said non-speech segments to produce the desired modified audio output signal. The system may operate in real time to process a live signal from a microphone or the like, or may be used to processed audio speech files into modified audio files that are played back at a later time.

As contemplated by the invention, one or more relationships that exist between a given selected social signaling characteristic and at least one of controllable parameter of the spoken audio signal may be determined. Thereafter, the digital signal processor modifies said at least the controllable parameter(s) in accordance with these relationships to control the selected social signaling characteristic.

These and other features and advantages of the present invention may be better understood by considering the following detailed description. In the course of this description, frequent reference will be made to the attached drawings.

DETAILED DESCRIPTION

The preferred embodiment of the present invention uses digital signal processing methods to modify one or more social signal ('tone of voice') features of a speaker's voice. Examples of these features are activity level, speaking rate, engagement, emphasis, pause length entropy, and mirroring, where:

"activity level" is the percentage of speaking time,

"speaking rate" is the rate of voiced segments,

"engagement" is the Markov influence each person has on the other's turn taking, "emphasis" includes the variation in energy, pitch, and spectral entropy, "pause length entropy" is a measure of the randomness of the segment in the frequency domain, and "mirroring" is the mimicking of the prosody of one participant by the other.

Figure 1:
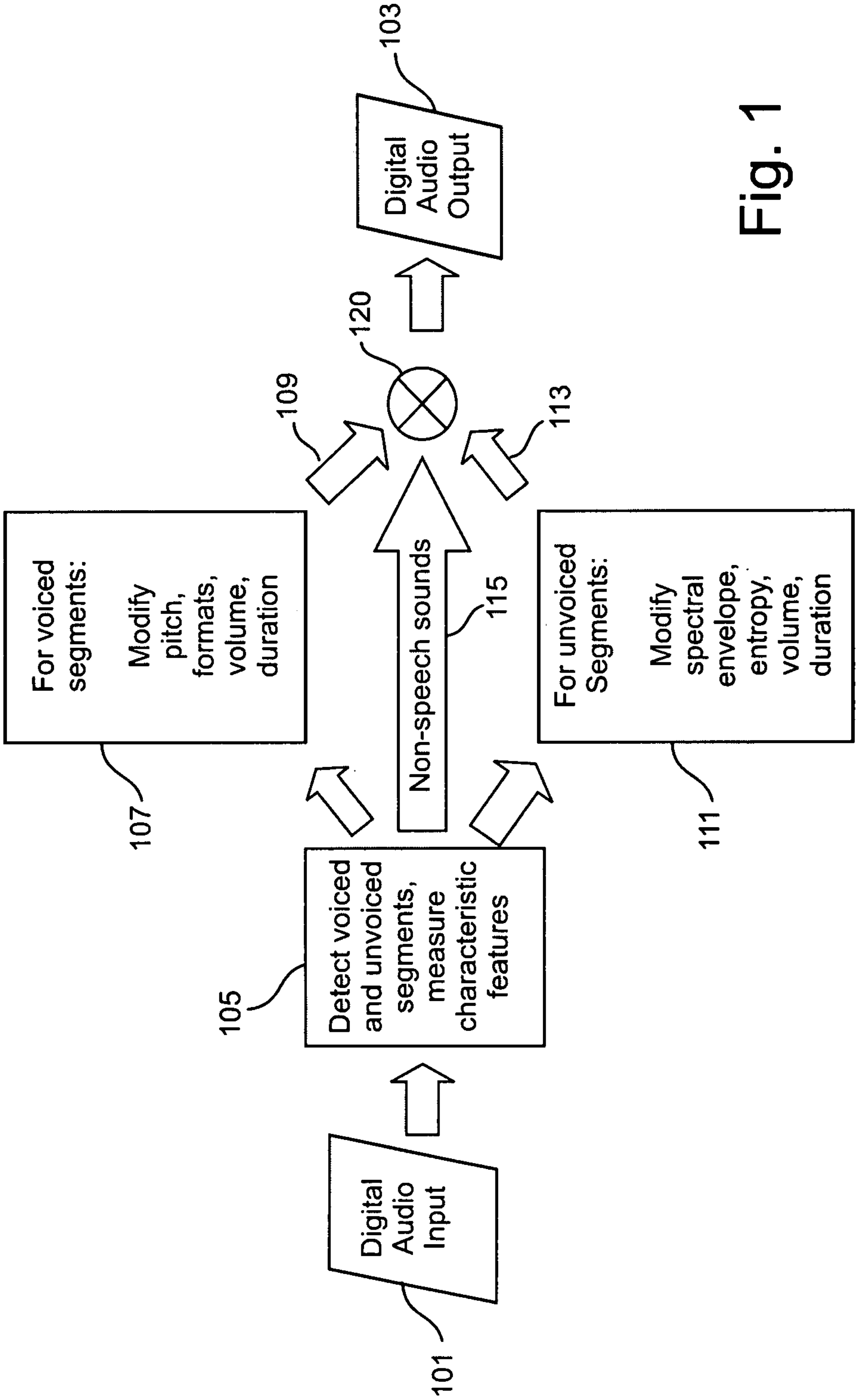
FIG. 1 is a block diagram illustrating the principal steps performed by preferred embodiments of the present invention.

The signal processing steps that may be employed in accordance with the invention are illustrated in FIG. 1 wherein a digital audio input signal seen at 101 is translated into a modified digital audio output signal indicated at 103.

As seen at 105, the digital input speech signal 103 is analyzed at 105 to identify the boundaries separating the signals voiced and unvoiced segments and its non-speech sounds.

The voiced speech segments detected at 105 are processed at 107 to modify characteristics of the voiced segments such as pitch, formants, volume and/or duration to produce a modified voice signal as indicated at 109. "Formants" are the distinguishing or meaningful frequency components of human speech (the information that humans require to distinguish between vowels can be represented purely quantitatively by the frequency content of the vowel sounds).

The unvoiced speech segments detected at 105 are processed at 111 to modify characteristics of the unvoiced segments such as the waveform's spectral envelope, entropy, volume and/or duration to produce the modified unvoiced segments indicated at 113, The non-speech sounds 115 detected at 105 are combined at 120 with the modified voice segments 109 and the modified unvoiced segments 111 to produce the digital audio output signal 103.

Figure 2:
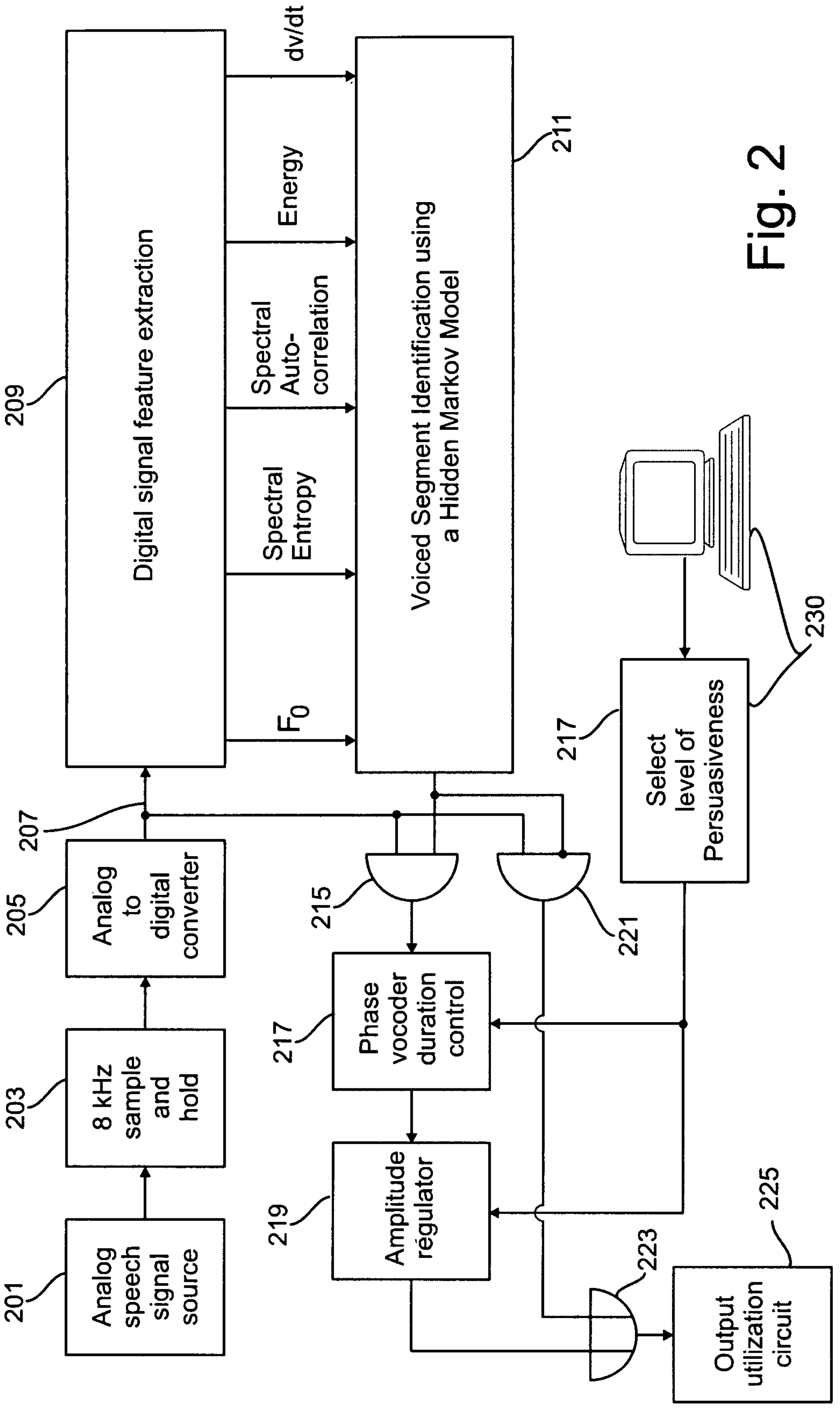
FIG. 2 is a block schematic diagram of a illustrative preferred embodiment used to automatically control the persuasiveness of speech messages.
Figure 3:
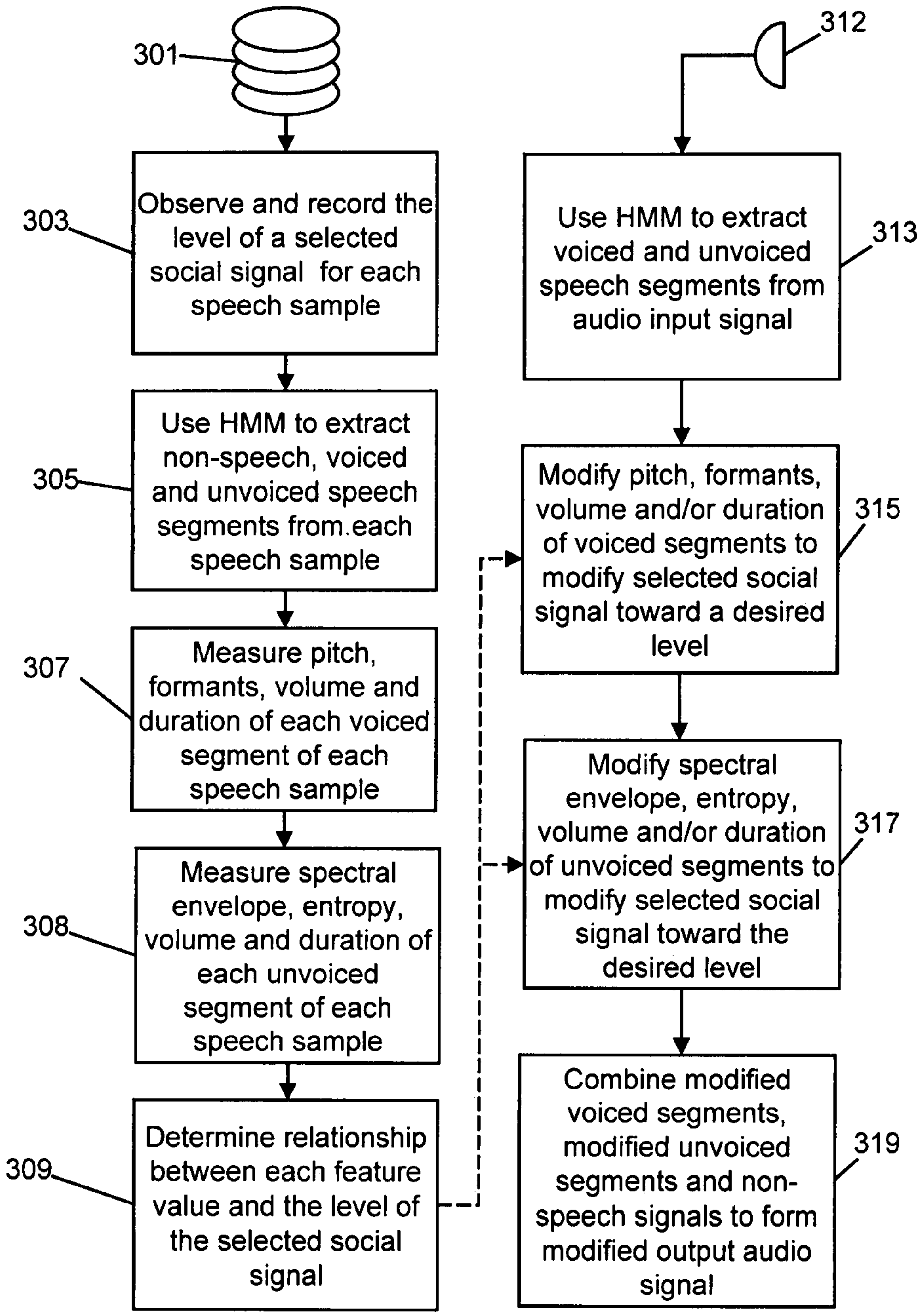
FIG. 3 is a flowchart depicting the principal steps used to select and then modify specific parameters of a speech message in order to control a selected social signaling characteristic of that message.

In the description that follows, a specific exemplary embodiment capable of controlling the persuasiveness of a voice message will be described in conjunction with FIG. 2, and FIG. 3 depicts an illustrative methodology for identifying and controlling those parameters of voiced and unvoiced segments that may be useful varied in order to control a selected social signaling characteristic.

Voice Segmentation and Decomposition

A preferred embodiment of the invention which modifies speech messages to control their level of persuasiveness is illustrated in FIG. 2 of the drawings. In this arrangement, the detectable features of voiced speech are analyzed. The term "voiced" as used herein refers to speech sounds that are produced when the vocal folds are vibrating (when vowel sounds are produced) and which accordingly have a spectra with a strong harmonic structure.

A variety of methods have been developed for distinguishing between voiced and unvoiced segments of a speech signal. These methods find features of voiced segments and then group these into utterances. Junqua et al. describe adaptive energy techniques in "A robust algorithm for word boundary detection in the presence of noise," *IEEE Transactions on Speech and Audio Processing,* 2(3):406-412, 1994. L. Huang and C. Yang pick out voiced regions using a measure of spectral entropy as they describe in "A novel approach to robust speech endpoint detection in car environments," *Proceedings of ICASSP '00*, pages 1751-54, IEEE Signal Processing Society, 2000. Sassan Ahmadi and Andreas S. Spanias use a combination of energy and cepstral peaks to identify voiced frames as they describe in "Cepsturm-based pitch detection using new statistical v/uv classification algorithm (correspondence)," *IEEE Transactions on Speech and Audio Processing,* 7(3): 333-338, 1999. Methods for distinguishing between speech and non-speech signals, and between voiced and unvoiced speech signals, are also described by Sumit Basu in a doctoral thesis entitled Conversational Scene Analysis, Dept. of Electrical Engineering and Computer Science, M.I.T., A. Pentland Thesis Supervisor (2002), and in *Social Dynamics: Signals and Behavior* by A. Pentland, ICDL, San Diego, Calif. October 20-23, IEEE Press (2004).

As illustrated in FIG. 2, a preferred embodiment which modifies a speech message to control its level of persuasiveness first extracts a basic set of speech features from the analog audio speech waveform. The analog waveform 201 is sampled at 8000 Hz. at 203 and each sample is converted to a digital value at 205 forming the digitized audio input 207. The digitized audio speech signal is then processed at 209 to measure the following observable parameters:

$F_0$: The fundamental frequency, i.e., the pitch of the voice. In adults the fundamental frequency $F_0$ is generally between 90 and 300 Hz, with females typically higher in the range than males.

Spectral entropy: A measure of the randomness of the segment in the frequency domain.

Spectral autocorrelation: Autocorrelation of the Fourier Transform of the window. A voiced segment will exhibit strong peaks in this signal due to its periodicity.

Energy: The volume (loudness) of a segment.

dv/dt Energy: The time-derivative of volume.

Digital signal processing is performed at 209 with a 256 sample window (32 ms) and a 128 sample step size (16 ms).

These five signal features are then processed at 211 using a two-level Hidden Markov Model (HMM) to identify voiced segments. A hidden Markov model (HMM) is a statistical model in which the system modeled is assumed to be a Markov process with unknown (hidden) parameters that are determined from observable parameters. In a regular Markov model, the state is directly visible to the observer, and therefore the state transition probabilities are the only parameters. In a hidden Markov model, the state is not directly visible, but variables influenced by the state are visible. Each state has a probability distribution over the possible output tokens. Therefore the sequence of tokens generated by an HMM gives some information about the sequence of states. Hidden Markov models are especially known for their application in temporal pattern recognition such as speech recognition and are well described in the literature. See, for example, *A Tutorial on Hidden Markov Models and Selected Applications in Speech Recognition* by Lawrence R. Rabiner, Proceedings of the IEEE, 77 (2), p. 257-286, February 1989.

As seen in FIG. 2, the five observable parameters measured at 209 are processed at 211 using a two-level HMM to identify the enodpoints (beginning and endings) of voiced utterances represented by the digitized audio input signal 207. These voiced segments are then passed by a gate 215 to a phase vocoder 217 which controls their duration, and to a volume regulator 219, which together perform automatic voice modification processing.

Voice Modification

Certain speech features correlate very highly with the ‘social signaling’ of a speaker. For instance, in the case of persuasiveness, the duration of speech segments is a very good indicator of the persuasive power of a communication. Volume and pitch regulation (making sure that the speaker’s voice has a constant range of volume and pitch dynamics) also correlates highly with persuasiveness. While other factors, such as short speech segments where the, speaker says “um,” “like,” and so forth, were also found to be negatively correlated with persuasion, these are not modified in the embodiment of FIG. 2 since they are difficult to automatically modify in continuous speech in a believable fashion. Thus, only those utterances having a duration greater than a predetermined threshold are passed by the gate 215 to the vocoder 217 and regulator 219. All shorter utterances and non-speech segments are passed by the inhibit gate 221 to the OR gate 223 which combines the modified and unmodified segments supplied to the output utilization circuit 225.

The method for controlling persuasiveness operates only on speaking regions, since it was found that the amount of time in between utterances has no effect on the persuasiveness of a speech message. The phase vocoder 217 expands or contracts the length of time of each longer utterance in the time domain without modifying its spectral domain characteristics. A phase vocoder is a standard digital signal processing method that performs the Short Time Fourier Transform (STFT) at fixed time intervals and calculates the frequency changes between each of these intervals. Calculating the frequency changes in the Fourier domain on a different time basis and inverse transforming then changes the time base of the signal.

Phase vocoders were described by Flanagan, J. and Golden, R. in the paper “Phase Vocoder,” Bell Syst. Tech. J., Nov. 1966. U.S. Pat. No. 3,982,070 issued to James L. Flanagan on Sep. 21, 1976 entitled “Phase vocoder speech synthesis system” describes how a phase vocoder may be used for synthesizing a natural sounding speech message by using a phase vocoder to altering the duration and the pitch parameters of stored spoken words. U.S. Pat. No. 6,868,377 issued to Laroche on Mar. 15, 2005 entitled “Multiband phase-vocoder for the modification of audio or speech signals” describes a method for processing a signal for pitch-shifting and the like by dividing the signal into a plurality of sub-band signals, wherein a selected sub-band signal that includes a region of interest is processed by a phase vocoder to produce a vocoder output signal. The subbands are then time-aligned with the vocoder output signal and combined to form an output signal. The disclosures of the foregoing U.S. Pat. Nos. 3,982,070 and 6,868,377 are incorporated herein by reference.

For volume regulation, the voiced speech segments whose durations have been altered by the phase decoder 217 are next processed at 219 to regulate their amplitude. The magnitude of each voiced segment is pushed closer to or farther from the mean, making sure to increase the magnitude of the resulting signal at every point so that the maximum volume is the same as before volume regulation was performed.

To control this transformation process, a Graphical User Interface (GUI) seen at 230 provided by a personal computer or the like allows the user to change the persuasiveness of the speech using a graphical slider control (not shown) that goes from 0 (not persuasive) to 1 (very persuasive). The initial setting of this slider indicates the voicing rate of the original speech determined by our speech analysis program. Increasing the “persuasiveness level” control signal using the slider interface 230 increases the duration of each utterance produced at 217, and increases the amount of regulation at 219, decreasing the extent to which the amplitude of the controlled voice segments is permitted to vary.

The program can be operated in a batch mode, where the analog speech signal source 201 is a sound message prerecorded as a WAV format sound file and the output utilization circuit 225 converts the digital output signal to analog form which is saved as a transformed WAV file for play back. Alternatively, the system can be operated in a ‘real time’ mode that continually transforms ongoing speech from a live source 201 (e.g. a microphone), with a short time delay to allow the analysis/transformation processing to occur before the transformed output is reproduced by a utilization circuit 225. For real-time outputs, the utilization circuit 225 may include an D-to-A converter whose output is coupled to a speaker or headphones.

Parameter Settings for Modifying Selected Social Signals

Other social signals can be transformed in a manner similar to the method used to control persuasiveness depicted in FIG. 2. Social signals such as helpfulness, attraction, interest, and similar attitudes can be augmented or diminished by using different parameter settings within this same audio processing framework.

The methodology for selecting the parameter settings that may be used to control a particular social signal is depicted in FIG. 3 of the drawings.

As previously discussed in connection with FIGS. 1 and 2, an digital audio input signal may be divided into its speech (spoken) and non-speech (noise, background sounds, etc.) components. The speech signals are then separated into voiced and unvoiced components, preferably using a two-level HMM model as discussed above in connection with FIG. 2. As seen in FIG. 1 at 107, the voiced components may be modified by varying their pitch, formants, volume or duration. In the case of a “persuasiveness control” shown in FIG. 2, only the duration and volume of voiced segments are controlled. As seen in FIG. 1 at 111, the spectral envelope, entropy, volume and/or duration of unvoiced segments may also be controlled to modify the tone of voice of the speech signal to modify other social signaling characteristics.

The parameters that can altered to control a particular kind of social signal may be determined by observing a statistically large number of different voice signals. As seen in FIG. 3, the speech signal samples in a library seen at 301 may be recorded from the speech of a substantial number of different speakers, with each speaker recording multiple samples in a different tone of voice. Each sample may then be listened to by one or more “judges” and assigned a value indicating the perceived level of a particular social signal of interest (e.g., interested, attracted, attentive, friendly, determined, submissive, persuasive or other similar property of a verbal social interaction) as indicated at 303.

Each such evaluated speech sample is then subdivided at 306 into its speech and non-speech segments, and the speech segments are further subdivided into voiced and unvoiced segments, preferably using a hidden Markov model (HMM) as described above in connection with FIG. 2. Signal processing is performed to measure the pitch, formants, volume and duration of each voiced segment as seen at 307. Similarly, each non-voiced speech segment is analyzed and its spectral envelope, entropy, volume and duration are determined and recorded as indicated a 308.

The resulting feature measurements are then-evaluated to determine the manner in which each feature varies in relation to variations in the selected social signal. Thus, for example, as discussed in connection with FIG. 2, it may be determined that longer duration voiced segments are typically deemed to be more persuasive that shorter segments, and that volume remains more constant for persuasive samples. Hence, controlling voiced segment duration and volume can be performed to control the level of persuasiveness.

Once the parameters of voiced and unvoiced segments which can be controlled to usefully modify a selected social signaling characteristic have been identified at 309, input voice signals can thereafter be automatically processed to modify those parameters and thereby control the selected social signaling characteristic. To do this, an input signal from a microphone 312 is processed using an HMM to extract its voiced and unvoiced segments at 313. To the extent that the modifications in pitch, formants, volume and/or duration of the voiced segments have been found to enhance a selected social signaling effect, the voiced signal is modified accordingly at 315. In the same way, to the extent that the spectral envelope, entropy, volume and/or duration of the unvoiced segments can be modified to better achieve the selected social signaling characteristic, those modifications are performed at 317. The modified voiced segments and the modified unvoiced segments are then combined with the non-speech segments at 319 to yield a modified audio output signal in which the selected social signaling effect has been altered as desired.

One key advantage of this approach is that it is fast and efficient, making it computationally feasible on resource-limited platforms, such as cell phones. It should be noted that from the process of collecting speech features alone, it is impossible to recover the actual words spoken, thereby mitigating most privacy or intellectual property concerns.

Controlling Social Signaling in Synthesized Speech

The invention may be advantageously employed to control the social signaling characterstics of artificially produced speech. Computer systems used to create artificial speech are called speech synthesizers, and can be implemented in software or hardware. Text-to-speech (TBS.) systems convert normal language text into speech while other systems render symbolic linguistic representations like phonetic transcriptions into speech. Synthesized speech is typically created by concatenating pieces of recorded speech that are stored in a database. Systems differ in the size of the stored speech units; a system that stores phones or diphones provides the largest output range, but may lack clarity. The system may store of entire words or sentences to produce high-quality output. Alternatively, a synthesizer can incorporate a model of the vocal tract and other human voice characteristics to create a completely "synthetic" voice output. An intelligable text-to-speech program allows people with visual impairments or reading disabilities to listen to written works on a home computer. Many computer operating systems have included speech synthesizers since the early 1980s.

Synthesized speech may be processed in the same way that human speech from a microphone is processed to control its social signaling characteristics; for example, a speech synthesizer may provide the digital audio input 101 seen in FIG. 1, may be the analog speech signal source 201 seen in FIG. 2, or may be substituted for the microphone 312 seen in FIG. 3.

Alternatively, the speech synthesizer may be directly controlled to produce a synthesized speech output having a tone of voice exhibiting one or more desired social signaling characteristics. Speech synthesizers are commonly capable of accepting control values that vary aspects of speech such as its volume, pitch, rate, etc. in standard ways.

The Speech Synthesis Markup Language (SSML) Specification promulgated by the World Wide Web Consortium is one of these standards. SSML is an XML-based markup language that permits authors to add markup tags to synthesizable text in order to control aspects of the generated speech such as pronunciation, volume, pitch, rate, etc.; As described in Section 3.2, Prosody and Style, of the W3C Recommendation entitled "Speech Synthesis Markup Language (SSML) Version 1.0, issued on Sep. 7, 2004, the markup file may include a voice element tags that requests a change in speaking voice. SSML markup tags may be used to control a rich set of voice parameters, including:

- specify a specific language, and to specify the desired gender and age of the speaker;
- specify that selected text be spoken with emphasis, using the level attribute to indicate the strength of emphasis to be applied, such as "strong", "moderate", "none" and "reduced";
- control the pausing or other prosodic boundaries between words;
- control the baseline pitch, pitch contour and pitch range of the speech;
- control the speaking rate, or the duration of the desired time taken to read selected text; and/or
- control the volume at which selected text is produced.

Many commercially available speech synthesizers are capable of controlling the pitch, speaking rate, volume and pauses of the produces speech in response to the instructions embedded as markup tags in the SSML text. For example, the VoiceText™ software synthesizer from NeoSpeech of Fremont, Calif. permits the pitch, speed, volume and pauses of the output speech to be controlled dynamically and/or to be specified by default values, and further supports these and other speech control commands imbedded in an SSML markup file.

Figure 4:
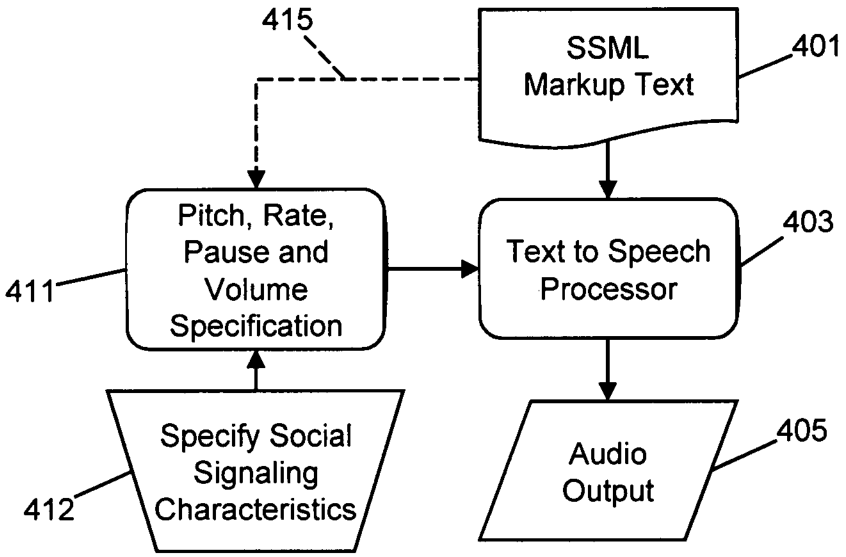
FIG. 4 shows use of a text to speech processor to parse SMLL text.

Speech synthesizers that support SSML may be used in a variety of ways to implement the present invention. For example, as illustrated in the flow diagram seen in FIG. 4, text to be transformed to speech may be expressed in SMLL as indicated at 401. A text to speech processor at 403 parses the SMLL text 401 and generates the audio speech output as an analog or digital speech signal seen at 405 which may be reproduced in real time or recorded for future use. The text to speech processor is further responsive to control inputs which specify the desired pitch, speaking rate, pauses between words, and volume of the output speech. These control inputs are produced at 411 in response to the specification of social signaling characteristics (e.g., interest, attraction, attentiveness, friendliness, determination, submissiveness, and/or persuasiveness), each of which may be specified as a level within a range (e.g., 0-9). The social signaling characteristics may be specified at 412 using one or more controls (e.g., graphical "sliders" in a computer interface). Alternatively, the social signaling characteristics may be specified in one or more markup tags in the SMLL markup text as illustrated by the dashed line input at 415; for example, the XML markup tags in the following illustrative markup text:

". . . <socialsignal signal friendliness=7 persuasiveness=9>text to be spoken </socialsignal> . . . "

could be inserted to instruct the synthesizer to adjust the pitch, volume, speaking rate and/or pauses to enhance the friendliness and persuasiveness of the speech produced.

Figure 5:
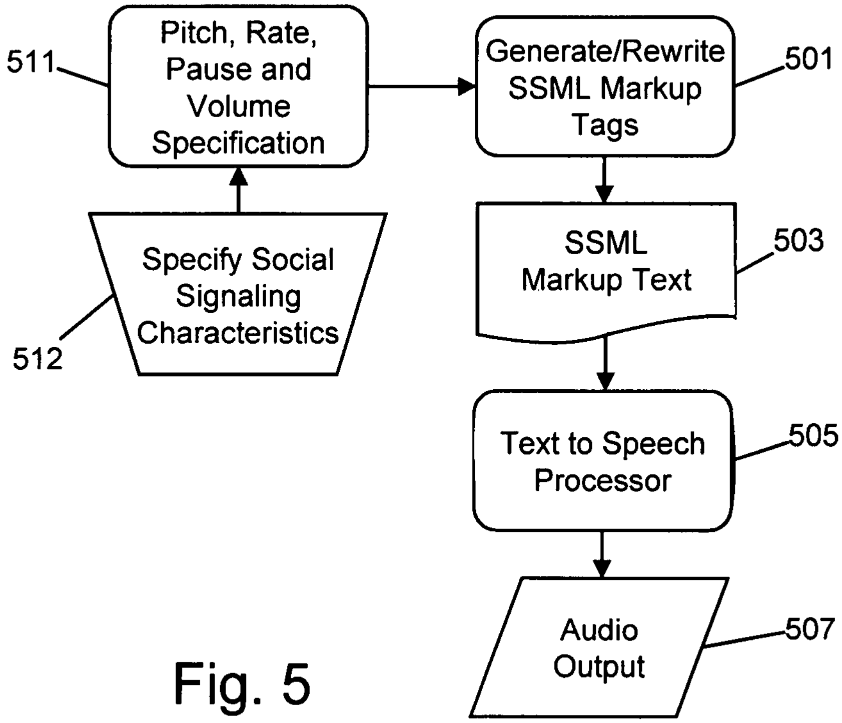
FIG. 5 shows use of a text processor to rewrite an SSML markup file.

Alternatively, as illustrated in FIG. 5, the invention may be implemented by a text processor which, as illustrated at 501, automatically rewrites the SSML markup file by inserting (or revising) SSML voice tags in the text of an SSML file 503 in order to instruct the text to speech processor 505 to control the pitch, volume, speaking rate, and pause times of the output speech 507 in order to provide that speech with the desired social signaling characteristics. The text processing of the SSML markup text 503 inserts new attribute values into new or existing SMLL tags, or rewrites attribute values already present in the SMLL file 503, in order to embed pitch, volume, speaking rate, and/or pause setting attributes in the SMLL tags in the resulting rewritten SMLL file 503, which is then parsed and converted to speech by the speech synthesizer 505 to produce speech having the social signaling characteristics specified by the input 509.

CONCLUSION

The methods and apparatus that have been described above are merely illustrative applications of the principles of the invention. Numerous modifications may be made by those skilled in the art without departing from the true spirit and scope of the invention.

What is claimed is:

1. A method of altering a selected real-time social signaling characteristic of an input audio voice signal, which method comprises processing in real-time said input audio voice signal in to modify one or more measurable parameters of said input audio voice signal to produce a modified output audio voice signal in which said selected real-time social signaling characteristic is modified, wherein said input audio voice signal is not generated by a speech synthesizer.

2. The method of claim 1 in which said social signaling characteristic is selected from a group comprising: interest, attraction, attentiveness, friendliness, submissiveness, and persuasiveness.

3. The method of claim 1 wherein said measurable parameters are selected from a group comprising activity level, engagement, emphasis, pause length entropy, and mirroring,

4. The method of claim 1, wherein the input audio voice signal is from a microphone.

5. The method of claim 4, wherein the input audio voice signal is processed in real time to produce the modified output audio voice signal.

6. The method of claim 1, wherein the input audio voice signal is a live signal.

7. The method of claim 1, wherein both the input audio voice signal and output audio voice signal are digital.

8. A system for modifying an audio input signal, the audio input signal comprising voiced segments and unvoiced segments, and said system comprising, in combination, a microphone for producing the audio input signal, and a signal processor for modifying said audio input signal to alter one or more attributes of at least selected ones of the voiced segments to alter one or more real-time social signaling characteristics of the audio input signal to form an audio output signal.

9. The system of claim 8 wherein said one or more social signaling characteristics is persuasiveness and wherein said signal processor alters the duration of said selected ones of said voiced segments.

10. The system of claim 9 wherein said signal processor alters the duration of said selected ones of said voiced segments without significant change in the spectral characteristics of selected ones of said voiced segments.

11. The system of claim 8 wherein:

said signal processor employs a phase vocoder to expand or contract the duration of said selected ones of said voiced segments, and said phase vocoder performs a Fourier transform at fixed time intervals and calculates frequency changes between these intervals.

12. The system of claim 8 wherein the audio input signal is a live signal.

13. The system of claim 9 wherein said signal processor further regulates the volume of said voiced segments.

14. The system of claim 8, wherein the audio input signal is processed in real time to produce the modified audio output signal.

15. Apparatus for automatically modifying one or more real-time social signaling characteristics of an audio input signal to produce a modified audio output signal comprising, in combination, a digital signal analyzer for determining the boundaries between speech segments and non-speech segments of said audio input signal, a digital signal processor for modifying one or more controllable parameters of said speech segments to produce modified speech segments having one or more modified real-time social signaling characteristics, and output means for combining said modified speech segments with said non-speech segments to produce said modified audio output signal, wherein said audio input signal is from a microphone.

16. The apparatus of in claim 15 wherein said digital signal analyzer further determines the boundaries between voiced and unvoiced segments of said speech segments and wherein said digital signal processor modifies one or more controllable parameters of said voiced segments.

17. The apparatus of claim 15, wherein the audio input signal is a live signal.

18. Apparatus for automatically modifying one or more social signaling characteristics of an audio input signal as set forth in-claim 15 further including means for determining and storing one or more relationships that exist between a given selected social signaling characteristic and at least one of said controllable parameters and wherein said digital signal processor modifies said at least one of said controllable parameters in accordance with at least one of said relationships to control said selected social signaling characteristic.

19. Apparatus for automatically modifying one or more social signaling characteristics of an audio input signal as set forth in claim 18 wherein said digital signal analyzer further determines the boundaries between voiced and unvoiced segments of said speech segments and wherein said digital signal processor modifies controllable parameters of said voiced segments.

20. The apparatus of claim 15, wherein the audio input signal is processed in real time to produce the modified audio output signal.

* * * * *